United States Patent
Elantably et al.

(10) Patent No.: US 9,118,271 B2
(45) Date of Patent: Aug. 25, 2015

(54) SYSTEM AND METHOD FOR NON-SINUSOIDAL CURRENT WAVEFORM EXCITATION OF ELECTRICAL GENERATORS

(71) Applicant: General Electric Company, Schenectady, NY (US)

(72) Inventors: Ahmed Mostafa Elantably, Carmel, IN (US); Ayman Mohamed Fawzi EL-Refaie, Niskayuna, NY (US); Robert Dean King, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/547,315

(22) Filed: Nov. 19, 2014

(65) Prior Publication Data
US 2015/0069977 A1 Mar. 12, 2015

Related U.S. Application Data

(62) Division of application No. 12/826,076, filed on Jun. 29, 2010, now Pat. No. 8,901,896.

(51) Int. Cl.
*H02P 9/08* (2006.01)
*H02P 9/30* (2006.01)
(Continued)

(52) U.S. Cl.
CPC *H02P 9/305* (2013.01); *H02P 9/10* (2013.01); *H02P 9/105* (2013.01); *H02P 9/14* (2013.01)

(58) Field of Classification Search
CPC ............. H02P 9/10; H02P 9/105; H02P 9/14; H02P 9/305
See application file for complete search history.

(56) References Cited

U.S. PATENT DOCUMENTS

| 4,066,938 A | 1/1978 | Turnbull |
| 4,112,339 A | 9/1978 | Lipo |
| 4,137,489 A | 1/1979 | Lipo |

(Continued)

FOREIGN PATENT DOCUMENTS

EP 0081904 A1 6/1983

OTHER PUBLICATIONS

Unofficial translation of Chinese Search Report from CN Application No. 201110191425.1 dated Sep. 22, 2014.
(Continued)

*Primary Examiner* — Tulsidas C Patel
*Assistant Examiner* — S. Mikailoff

(57) ABSTRACT

An electrical generator includes a stator having fractional-slot concentrated windings and a rotor having field windings. A drive is provided having a circuit to control current flow to the field windings and a controller to input an initial DC field current demand to the circuit to cause the circuit to output an initial DC field current representative of a DC field current demand that would cause an electrical generator having sinusoidal stator windings to output a desired AC power. The controller receives feedback on the magnetic field generated by the initial DC field current, isolates an ideal fundamental component of the magnetic field based on the feedback and to generate a modified DC field current demand, and inputs the modified DC field current demand to the circuit, thereby causing the circuit to output an instantaneous non-sinusoidal current to the field windings to generate a sinusoidal rotating air gap magnetic field.

16 Claims, 4 Drawing Sheets

(51) Int. Cl.
    *H02P 9/10*       (2006.01)
    *H02P 9/14*       (2006.01)

(56) References Cited

U.S. PATENT DOCUMENTS

| | | |
|---|---|---|
| 4,144,470 A | 3/1979 | Auinger |
| 4,751,448 A | 6/1988 | Auinger |
| 5,272,429 A | 12/1993 | Lipo et al. |
| 5,883,487 A | 3/1999 | Rosenzweig et al. |
| 6,262,550 B1 | 7/2001 | Kliman et al. |
| 6,498,451 B1 | 12/2002 | Boules et al. |
| 8,222,855 B2 | 7/2012 | El-Antably et al. |
| 8,310,115 B2 | 11/2012 | Elantably et al. |
| 2011/0050151 A1 | 3/2011 | El-Antably et al. |
| 2012/0019083 A1 | 1/2012 | Elantably et al. |
| 2012/0326652 A1 | 12/2012 | Elantably et al. |

OTHER PUBLICATIONS

Search Report and Written Opinion from EP Application No. 11170924.2, dated Mar. 21, 2013.

El-Refaie, "Fractional-Slot Concentrated-Windings Synchronous Permanent Magnet Machines: Opportunities and Challenges", IEEE Transactions on Industrial Electronics, vol. 57, No. 1, Jan. 2010, pp. 107-121.

Jahns et al., "Pulsating Torque Minimization Techniques for Permanent Magnet AC Motor Drives—A Review", IEEE Transactions on Industrial Electronics, vol. 43, No. 2, Apr. 1996, pp. 321-330.

Shaogang et al., "Calculation of the Third Harmonic Excitation of Synchronous Generator Using Tooth Flux Method", Proceeding of International Conference on Electrical Machines and Systems, Oct. 8-11, 2007, Seoul, Korea, pp. 1206-1209.

Zhu et al., "Optimal Excitation of Permanent Magnet Synchronous Machines via Direct Computation of Electromagnetic Force Components", Electric Machines and Drives, IEEE International Conference, May 15, 2005, pp. 918-925.

SYSTEM AND METHOD FOR NON-SINUSOIDAL CURRENT WAVEFORM EXCITATION OF ELECTRICAL GENERATORS

CROSS REFERENCE TO RELATED APPLICATIONS

The present application is a divisional of, and claims priority to, U.S. patent application Ser. No. 12/826,076 filed on Jun. 29, 2010, the disclosure of which is incorporated herein in its entirety.

BACKGROUND OF THE INVENTION

The invention relates generally to electrical generators and, more particularly, to a control scheme for exciting an electrical generator having fractional-slot concentrated windings and rotor field windings.

The usage of electrical machines in various industries has continued to become more prevalent in numerous industrial, commercial, and transportation industries over time. There has been tremendous progress and great achievements in the field of power electronics and control techniques for such electrical machines, resulting in increased energy savings and control flexibility. Providing for such achievements has been the continued progress in computer technology that has resulted from digital technology. Digital technology has lead to very significant reductions in the size and cost of computers, allowing them to successfully replace old, bulky, and relatively expensive mechanical systems.

While the capability of digitally enhanced control systems and computers has progressed, the structure of the electrical machines used with such control systems has, for the most part, remained unchanged. For example, the large majority of fixed speed electrical generators, such as those used in power stations, are designed using distributed sinusoidal windings on the stator and a DC field or permanent magnets on the rotor. As shown in FIG. 1, a prior art electrical generator 2 may be equipped with integral-slot distributed stator windings 4 and permanent magnets 6 on the rotor 8. As an example, FIG. 1 illustrates a 24-slot, overlapping distributed arrangement of stator windings 4. In operation, the permanent magnets 6 of generator 2 create the magnetic field in the air gap between rotor 8 and stator windings 4, which rotates the rotor 8 and generates electrical energy in the stator windings 4.

Construction of electrical generators in accordance with the structure of generator 2 illustrated in FIG. 1, that implement distributed sinusoidal windings 4, are however subject to drawbacks in performance and costs associated therewith. For example, electrical generators that implement distributed sinusoidal windings suffer from a decreased efficiency due to electrical losses in the end windings. The end winding length contributes to increased resistance, thereby resulting in higher Ohmic losses that decrease the efficiency of the generator. The end winding length also requires implementation of a complex cooling system (e.g., liquid hydrogen cooling system), which leads to increased cooling cost in the electrical generator. Furthermore, the permanent magnets limit power density, energy efficiency, operating temperature, life cycle, and reliability of the electrical generator.

In addition to increased operating costs, electrical generators such as shown in FIG. 1 that implement distributed sinusoidal windings and permanent magnets are also more costly to construct. For example, such electrical generators often include expensive thin stator laminations that are expensive to construct. Furthermore, the permanent magnets on the rotor used to create the air gap magnetic field are expensive compared to generators incorporating electromagnets or field windings.

Therefore, it would be desirable to design an electrical generator that can employ non-sinusoidal stator windings so as to reduce costs associated with production and operation thereof. It is further desired that a control scheme be provided for controlling electrical generators that employ non-sinusoidal stator windings that suppresses the effect of the additional harmonic components typically associated with non-sinusoidal windings, so as to minimize harmonics and maintain high power density and high efficiency in the generator.

BRIEF DESCRIPTION OF THE INVENTION

Embodiments of the invention overcome the aforementioned drawbacks by providing a system and method for exciting an electrical generator having fractional-slot concentrated windings and rotor field windings by way of an instantaneous, non-sinusoidal current.

In accordance with one aspect of the invention, an electrical generator includes a stator having a plurality of fractional-slot concentrated windings, a rotor positioned within the stator to rotate relative thereto and having field windings electrically coupled thereto configured to generate a rotating magnetic field in an air gap between the stator and the rotor responsive to a current applied thereto, and a drive having an input connectable to a power source and an output connectable to the field windings. The drive further includes a circuit configured to control current flow to the field windings and a controller connected to the circuit and programmed to input an initial DC field current demand to the circuit to cause the circuit to output an initial DC field current, with the initial DC field current demand being representative of a DC field current demand that would cause an electrical generator having sinusoidal stator windings to output a desired AC power. The controller is further programmed to receive feedback on the rotating magnetic field generated by the initial DC field current, determine and isolate an ideal fundamental component of the rotating magnetic field based on the feedback, generate a modified DC field current demand based on the ideal fundamental component, and input the modified DC field current demand to the circuit, thereby causing the circuit to output an instantaneous non-sinusoidal current to the field windings to generate a sinusoidal rotating air gap magnetic field.

In accordance with another aspect of the invention, a method for generating AC power in an electrical generator having a stator having a plurality of fractional-slot concentrated windings and a rotor having a plurality of field windings is provided, that includes inputting a test DC field current demand to an inverter that is representative of a DC field current demand that would cause an electrical generator having sinusoidal stator windings to output a desired AC power and generating an initial DC field current in the inverter in response to the test DC field current demand, with the initial DC field current being output to the plurality of field windings on the rotor to generate a test rotating magnetic field between the rotor and the stator. The method also includes determining a fundamental component and harmonic components of the rotating magnetic field, determining an ideal fundamental component for the rotating magnetic field from the test DC field current demand and the fundamental component, and determining a desired current waveform based on the ideal fundamental component. The method further includes generating a modified DC field current demand based on the desired current waveform and inputting the modified DC field current demand to the inverter, thereby causing the inverter to output a non-sinusoidal AC current waveform to the plurality of field windings on the rotor to generate a sinusoidal rotating magnetic field, thereby generating AC power in the electrical generator.

In accordance with yet another aspect of the invention, an electrical generator includes a stator having a plurality of non-sinusoidal concentrated windings, a rotor positioned within the stator to rotate relative thereto and having field windings configured to generate a rotating magnetic field in an air gap between the stator and the rotor responsive to a current applied thereto, and a drive to control current flow from a power source to the field windings. The drive is configured to provide an initial input current to the rotor based on a first current demand that is representative of a DC field current demand that would cause an electrical generator having sinusoidal stator windings to output a desired AC power and receive feedback on the rotating magnetic field generated by the initial input current. The drive is further configured to generate a second current demand based on the feedback and provide an instantaneous modified input current to the field windings based on the second current demand so as to generate a sinusoidal rotating magnetic field in the air gap and generate AC power in the electrical generator, wherein the instantaneous modified input current comprises a non-sinusoidal current waveform.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Embodiments of the invention are directed to electrical generators having non-sinusoidal concentrated stator windings and to a control scheme for providing current to field windings on the rotor to generate a sinusoidal air gap magnetic field between the rotor and the stator. The control scheme processes an initial DC field current demand applied to an inverter/electronic processing circuit in order to generate instantaneous non-sinusoidal current demands that, when applied to the field windings, will produce rotating air gap magnetic fields with only fundamental components and eliminate all field harmonics, thus resulting in the best energy conversion from the rotor to the stator, i.e. high output power at high efficiency.

Figure 2:
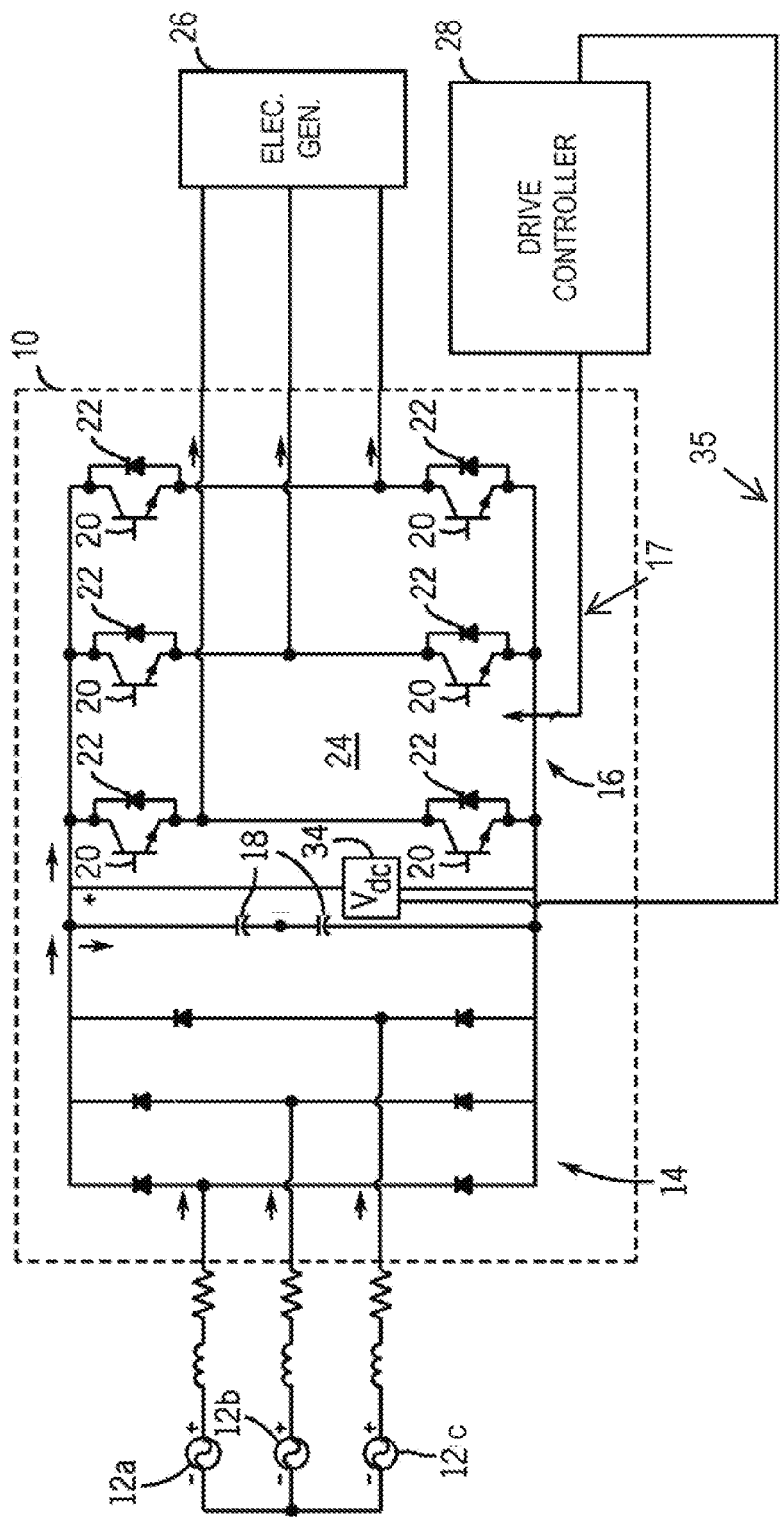
FIG. 2 a schematic of an AC drive according to an embodiment of the invention.

Embodiments of the invention are directed to electrical generators, including variable and fixed speed electrical generators, and to a control scheme for operating the electrical generators. The general structure of an AC drive 10 is shown in FIG. 2 according to one embodiment of the invention. The drive 10 may be configured, for example, as an adjustable speed drive (ASD) designed to receive a three phase AC power input, rectify the AC input, and perform a DC/AC conversion of the rectified segment into a three-phase alternating voltage of variable frequency and amplitude that is supplied to an electrical machine, such as an electrical generator. According to alternate embodiments, it is recognized that drive 10 may be designed to receive a DC power input and perform a DC/AC conversion of the DC power into a multi-phase alternating voltage of variable frequency and amplitude that is supplied to an electrical machine. In a preferred embodiment, the ASD operates according to an exemplary volts-per-hertz characteristic. In this regard, the drive provides voltage regulation of ±1% in steady state with less than 3% total harmonic distortion, ±0.1 Hz in output frequency, and fast dynamic step load response over a full load range.

According to one embodiment, a three-phase AC input 12a-12c is fed to a three-phase rectifier bridge 14. The input line impedances are equal in all three phases. The rectifier bridge 14 converts the AC power input to a DC power such that a DC bus voltage is present between the rectifier bridge 14 and a switch array 16. The bus voltage is smoothed by a DC bus capacitor bank 18. The switch array 16 is comprised of a series of IGBT switches 20 and anti-parallel diodes 22 that collectively form an inverter or chopper circuit 24. The inverter 24 synthesizes AC voltage waveforms for delivery to an electrical machine, such as an electrical generator 26 according to current demands generated by a drive controller 28, coupled to switch array 16 by conductors 17, as will be explained in greater detail below. The controller 28 interfaces to the inverter 24 via current demand signals and sensing of the DC bus voltage and pole currents (by way a voltage sensor 34, for example, coupled to drive controller 28 by conductor 35) such that changes in DC bus voltage can be sensed. These voltage changes can be interpreted as transient load conditions and are used in the generation/input of instantaneous current demands to inverter 24, such that near steady-state load conditions are maintained.

According to the embodiment shown in FIG. 2, electrical generator 26 is in the form of a variable speed electrical generator that implements inverter 24 to provide for variable speed operation. However, it is also recognized that embodiments of the invention can also be directed to a fixed speed electrical generator (e.g., an alternator), in which case a simplified drive 10 could be implemented in which inverter 24 is replaced by a more simplified electronic processing circuit (not shown) that synthesizes AC voltage waveforms for delivery to electrical generator 26 according to current demands generated by drive controller 28.

Figure 1:
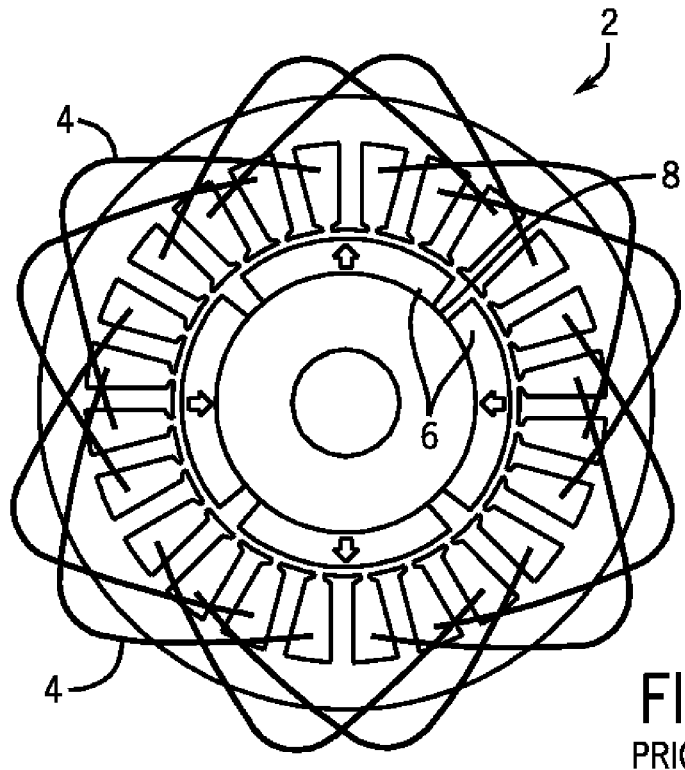
FIG. 1 is a schematic diagram of a prior art stator winding configuration for an electrical generator.
Figure 3:
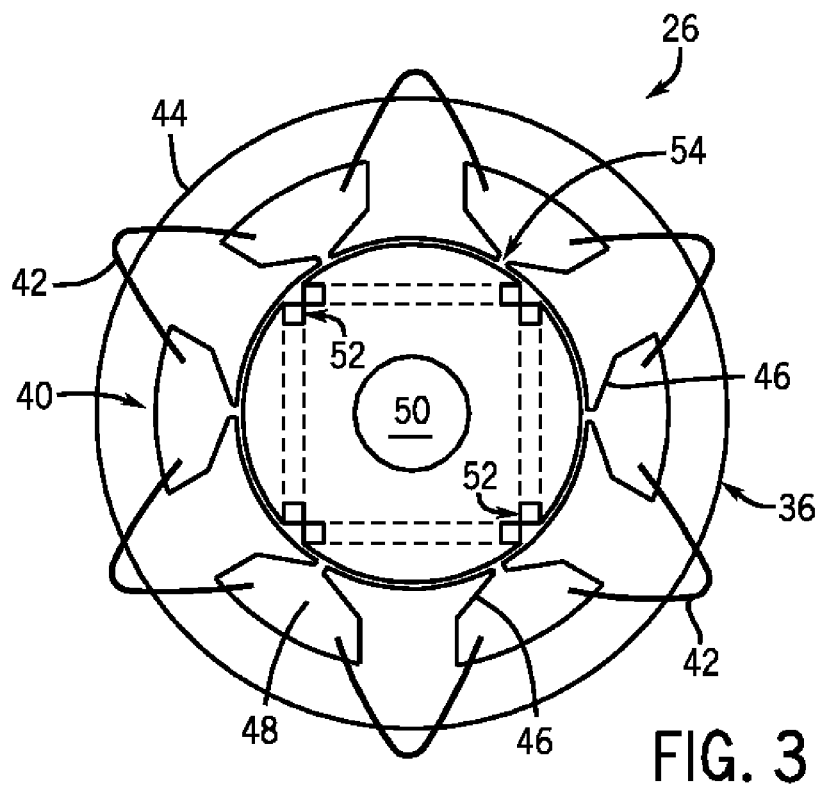
FIG. 3 is a schematic diagram of a stator winding configuration and field winding arrangement for an electrical generator according to an embodiment of the invention.

According to an embodiment of the invention, electrical generator 26 has a construction such as shown in FIG. 3, for example. As shown in FIG. 3, electrical generator 26 includes therein a stator 36 having a stator core 40 and windings 42 wound on the stator core 40. The stator core 40 has a core main body 44 formed by stacking a large number of annular-shaped thin plates made of electromagnetic steel and insulators (not shown) provided on axial end surfaces of the core main body. The stator core 40 is provided with a plurality of teeth 46 at a predetermined pitch along a circumferential direction thereof. According to an exemplary embodiment, windings 42 are wound on the respective teeth 46, and thus are in the form of fractional-slot concentrated windings or "tooth windings." Slots 48 are formed between adjacent teeth 46 along the circumferential direction. As shown in FIG. 3, one embodiment of stator 36 includes six slots 48, with a non-overlapping concentrated arrangement of windings 42 wound about all teeth 46, according to an embodiment of the invention. It is recognized that electrical generators 26 including other arrangements of concentrated windings are envisioned as being usable with embodiments of the present invention, and thus the winding arrangement of FIG. 3 is merely exemplary.

As further shown in FIG. 3, a rotor 50 is rotatably fitted in the stator 36. The rotor 50 has coils wound thereon to form four-pole field windings 52 that when supplied with an excitation current, such as the non-sinusoidal current waveform explained in greater detail below, will excite the DC magnetic field on the rotor 50 so as to generate a rotating magnetic field in an air gap 54 between the rotor 50 and the stator 36. The field windings 52 can receive such an excitation current from inverter 24 (FIG. 2), for example, according to current demands generated by drive controller 28. Thus, upon a supplying of current to field windings 52, the rotating magnetic field. generated in air gap 54 between the rotor and the stator causes AC power to be generated in stator 36, such that electrical generator 26 generates AC power.

Figure 4:
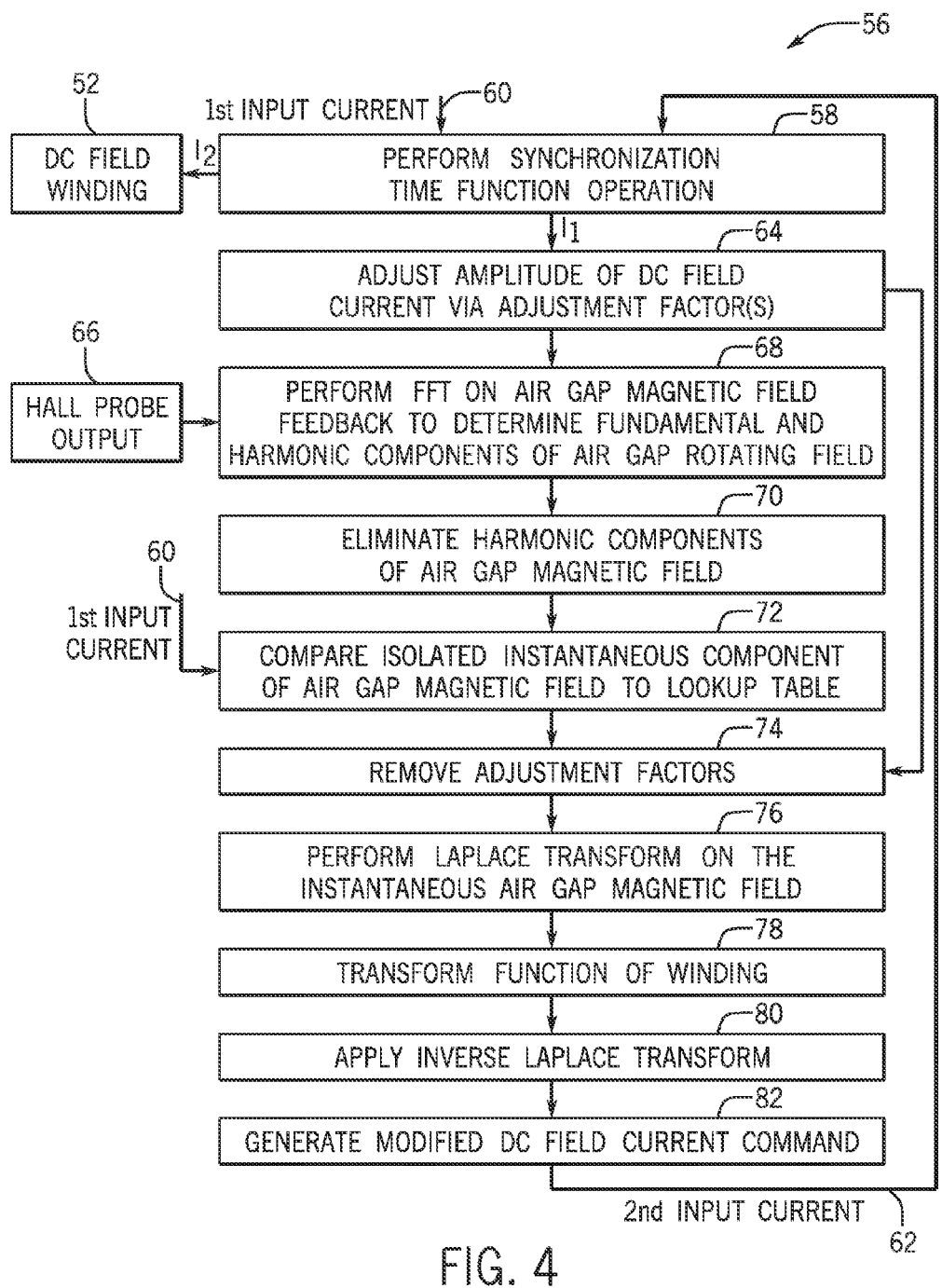
FIG. 4 is a flow diagram of a controller implemented technique for controlling an AC drive according to an embodiment of the invention.

Referring now to FIG. 4, and with continued reference to FIGS. 2 and 3, a block diagram is shown representative of a control scheme 56 for operating drive 10 that is implemented, for example, by controller 28. The control scheme 56 of FIG. 4 performs electronic processing details (EPD) used together with an electrical generator 26 having fractional-slot concentrated stator windings 42 and rotor field windings 52 to achieve high power density, high efficiency, and reduced cost of both the electrical generator 26 and the inverter 24. That is, control scheme 56 is implemented in order to generate instantaneous non-sinusoidal current demands that will excite the DC magnetic field on the rotor 50 and generate rotating air gap fields with only fundamental components and eliminate all field harmonics, thus resulting in the best energy conversion from the rotor 50 to the stator 36, i.e. high output power at high efficiency.

Initially, BLOCK 58 of control scheme 56 performs a selective "synchronization time function" operation on a received first input current 60 and received second input current 62. The first input current 60 is an initial or test current input that is generated in response to an initial DC field current demand, and thus is termed an initial DC field current. The initial DC field current demand is representative of a current demand needed to generate the DC magnetic field on the rotor if a perfect sinusoidal winding were used on the stator of electrical generator 26. In an initial iteration, or test/setup run, second input current 62 is absent.

The first input 60 passes through BLOCK 58 unaffected (i.e., no time synchronization performed on first input 60) responsive to the initial DC field current demand. The first input 60 is thus received at BLOCK 64, with BLOCK 64 functioning to adjust an amplitude of the DC field current according to, for example, a stored table of current demand values and appropriate adjusting factors. For example, if first input 60 is representative of a high DC field current demand, the amplitude is adjusted so as to avoid producing high losses in the stator 36. Conversely, if first input 60 is representative of a very low DC field current demand, the demanded DC field current will be adjusted appropriately (i.e., increased) so as to produce a rotating air gap magnetic field that can be easily detected, as will be explained below. The adjustment factor added by BLOCK 64 is then stored for later use as a reference loop to produce the real instantaneous current, (i.e., second current loop 62), which is used to produce the clean demanded sinusoidal output power from electrical generator 26, as will be explained below.

When applied to the adjusted DC field current added at BLOCK 66 will produce a rotating air gap magnetic field between the rotor 50 and the stator 36, with the air gap magnetic field including unwanted harmonic components due to the concentrated/concentric windings 42 of the stator. The rotating air gap magnetic field is then detected by using high temperature Hall probes 66 integrated into electrical machine 26, for example, with the number of Hall probes 66 needed depending on the stator inside diameter and the resolution needed for downstream accurate signal processing. Alternatively, search coils (not shown) located preferably at the center of the stator 36 could be implemented, with the search coils being added during winding of the stator coils 42 and being kept inside the stator slots 48.

The output of the search coils/Hall probes 66 is transmitted to BLOCK 68 and is received thereby (i.e., received by controller 28) as feedback on a strength of the rotating air gap magnetic field. A fast Fourier transform (FFT) is performed on the air gap magnetic field feedback at BLOCK 68 to determine/analyze the fundamental component and the harmonic components of the air gap rotating field. That is, instantaneous values of the fundamental component and the harmonic components of the air gap rotating field are determined.

Values for the instantaneous fundamental component and the instantaneous harmonic components of the air gap rotating field determined in BLOCK 68 are passed to BLOCK 70, which acts to eliminate the harmonic components of the air gap magnetic field. The fundamental component of the air gap magnetic field is thus isolated and is subsequently passed to BLOCK 72. As shown in FIG. 4, the isolated instantaneous fundamental component of the air gap magnetic field is input to BLOCK 72 along with the first input 60 (i.e., the initial DC field current). A lookup table is stored in BLOCK 72 that has stored therein a plurality of DC field currents and the ideal fundamental component of a rotating magnetic field generated from each of the plurality of DC field currents. The "ideal" fundamental component of the rotating magnetic field associated with each demanded DC field current is defined in the lookup table as the highest fundamental component generated by input of the demanded DC field current to an electrical generator having sinusoidal windings.

The isolated instantaneous fundamental component of the air gap magnetic field and the initial DC field current of the first input 60 are analyzed/compared to the lookup table in BLOCK 72. More specifically, the instantaneous fundamental component of the air gap magnetic field and the initial DC field current are analyzed with respect to the lookup table to determine what DC field current need be applied to an electrical generator having sinusoidal windings in order to generate the instantaneous fundamental component of the air gap magnetic field. Based on this determination, a correction is applied to the instantaneous fundamental component of the rotating magnetic field, such that the ideal fundamental component for the needed DC field current is realized.

Referring still to FIG. 4, upon determination of the ideal fundamental component of the rotating magnetic field, the ideal fundamental component is input to BLOCK 74. Also in BLOCK 74, the adjustment factor previously applied to the initial DC field current in BLOCK 64 is removed, by having an input from BLOCK 64 to BLOCK 74 to cancel the adjustment done earlier. That is, BLOCK 74 has a table which takes the amplitude of the fundamental air gap field produced from BLOCK 72 and determines a DC field current ideally needed to produce it. This determined DC field current is multiplied by the inverse of the correction factor from BLOCK 64 and compared to the initial DC field current to make sure that they are identical. This fundamental air gap magnetic field is the best representation of the fundamental air gap field at that time for the original DC field current (which contains both time and space harmonics) as if the electrical generator 26 had a perfectly sinusoidal stator winding.

A "true" fundamental air gap signal is thus output from BLOCK 74 and received by BLOCK 76. At BLOCK 76, a Laplace transform is performed on the signal from BLOCK 74. Next, BLOCK 78 represents the Laplace transfer function of the concentrated winding in the electrical machine. The transfer function of BLOCK 78 is obtained between the first input 60 (i.e., the amplitude of the initial DC field current) to the electrical generator 26 and the rotating magnetic field as measured by the search coils/Hall probes (i.e., the fundamental of the rotating magnetic field). This is measured over the full speed range of the electrical generator 26 using standard small signal perturbation techniques, as known in the control industry.

The output of BLOCK 76, which is the Laplace transfer of the instantaneous air gap magnetic field, is considered to be the input of BLOCK 78, which is the transfer function of the fractional-slot concentrated winding. Next, at BLOCK 80, the inverse Laplace transform is applied to the output of BLOCK 78 to re-construct the exact instantaneous low voltage current waveform that, when applied to the inverter, will produce the desired instantaneous current. A desired current waveform for generating the ideal fundamental component of the rotating magnetic field is thus determined from BLOCKS 76, 78, and 80. Based on the desired current waveform, a modified DC field current demand is generated at BLOCK 82 that will produce the desired current waveform when applied to the inverter 24, so as to produce the required fundamental air gap field.

At BLOCK 58, the first input current 60 is zeroed and a synchronization time function operation is performed on the second current 62 according to the modified DC field current demand, so as to adjust the timing of the second input current. Application of the modified DC field current demand to inverter 24 generates a modified input current (i.e., second current 62), which is output from inverter 24 in the form of a high power, instantaneous non-sinusoidal current. The adjusted (i.e., instantaneous) non-sinusoidal current is applied to the field windings 52 of the rotor 50 to produce a sinusoidal air gap magnetic field that produces a high output power with minimum losses, as there are no harmonics in the air gap field despite the fact that a concentrated/concentric winding 42 (i.e., non-sinusoidal winding) is used on the stator 36.

Figure 5:
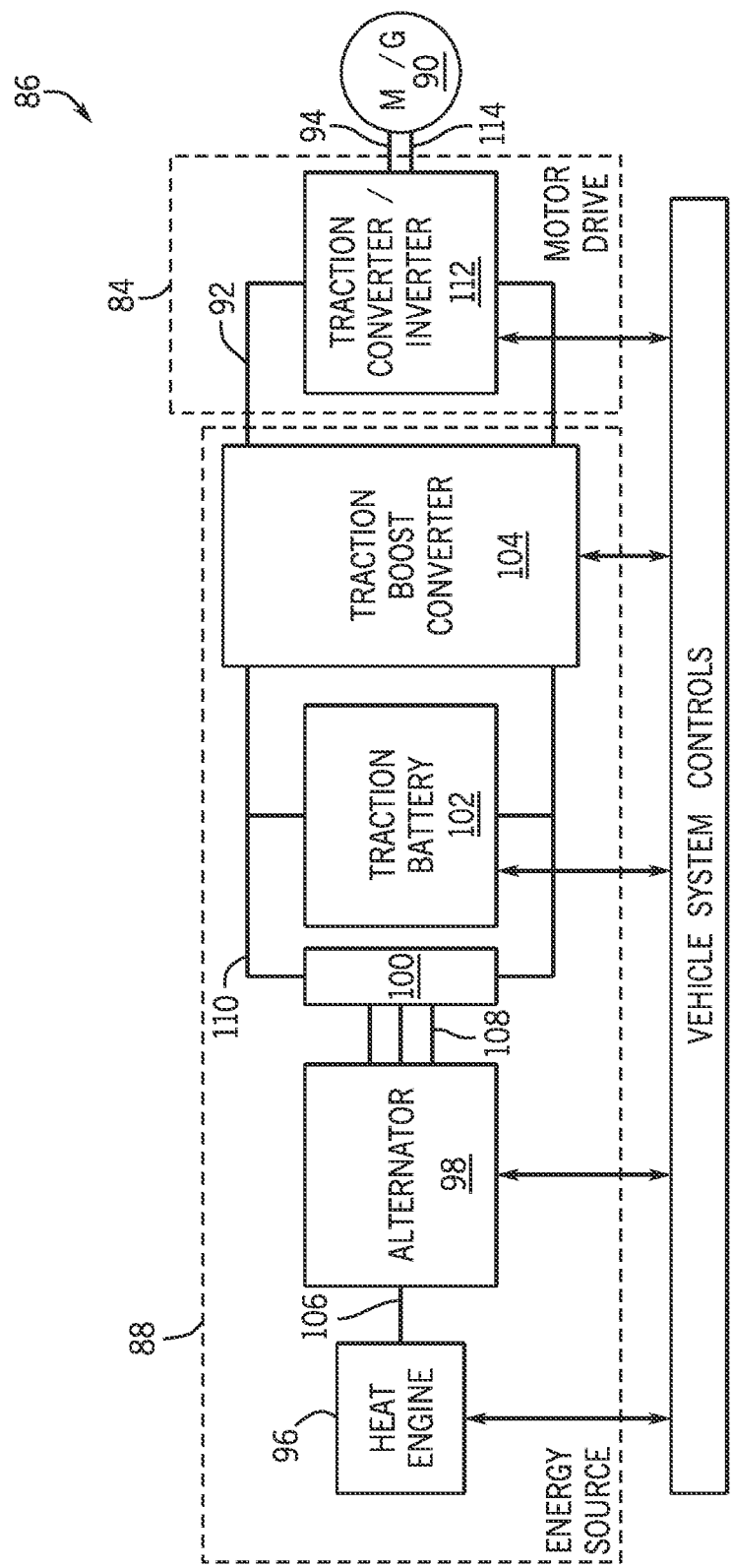
FIG. 5 is a block schematic diagram of an apparatus for producing tractive effort incorporating a drive and electrical generator according to an embodiment of the invention.

Referring now to FIG. 5, a drive 84 implementing a control scheme/electronic processing as described in FIG. 4 is shown as incorporated into a hybrid electric vehicle (HEV) AC propulsion system 86 that produces tractive effort and implements regenerative braking, according to an embodiment of the invention. Propulsion system 86 includes drive 84, an energy source 88, and an electrical machine 90 configured to selectively operate both as an electric motor and electrical generator, with the electrical machine having fractional-slot concentrated windings, or tooth windings.

In producing tractive effort from system 86, energy source 88 generates a high DC voltage 92 and drive 84 generates a multi-phase motor voltage 94 from high DC voltage 92, with electrical machine 90 producing tractive effort from motor voltage 94. In the embodiment of FIG. 5, energy source 88 is configured as a hybrid-electric energy source that comprises a heat engine 96, an alternator 98, a rectifier 100, a traction/energy battery 102, and a traction boost converter 104. Traction boost converter 104 is sometimes referred to as bi-directional DC-DC converter, or a bi-directional boost/buck converter that functions to decouple the voltage between the input and the output of the device while efficiently transferring power. In operation to produce tractive effort, heat engine 96 generates mechanical power 106 by burning a fuel. Alternator 98 generates an alternating voltage 108 from mechanical power 106 and rectifier 100 then rectifies alternating voltage 108 to produce a low DC voltage 110. Traction battery 102 stores and delivers energy derived from low DC voltage 110 and traction boost converter 104 boosts low DC voltage 110 to produce high DC voltage 92. As used herein in reference to DC voltages, "low" and "high" are relative terms only and imply no particular absolute voltage levels. The high DC voltage 92 is transferred to drive 84, which includes therein a converter/inverter 112 that receives high DC voltage 92 and, responsive thereto, generates a multiphase AC motor voltage 94 from high DC voltage 92 that is provided to electrical machine to produce tractive effort.

Additionally, converter/inverter 112 is configured to generate high DC voltage 92 from multi-phase motor voltage 94 during a regenerative braking operation. That is, during a regenerative braking operation, the electrical machine 90 is caused to operate with a torque that is opposite polarity of the torque that produces acceleration (reversed torque as opposed to a torque that produces traction power) thereby causing it to decelerate or slow the vehicle's wheels. While running in a regenerative braking mode, the electrical machine 90 acts as an electrical generator, producing a multi-phase voltage 94 that is fed through traction inverter/converter 112 into the traction battery 102. Specifically, the high DC voltage 92 that is produced from motor multi-phase voltage 94 flows from the high voltage side 92 of the bi-directional DC-DC converter 104 to the lower voltage side 110 of the bi-directional DC-DC converter 104 through a "buck" mode of operation.

For controlling electrical machine 90 during regenerative braking to cause the electrical machine to operate as a generator, drive 84 generates an initial DC field current demand (i.e., a first input). As set forth in detail with respect to FIG. 4, drive 84 (i.e., a controller in motor drive 84) transmits the initial DC field current demand to traction inverter 112 to produce an initial current for transmission to a rotor (not shown) of electrical machine 90. Electrical generator 90 generates a rotating air gap magnetic field responsive to the initial DC field current demand, from which drive 84 determines fundamental and harmonic components. The harmonic components of the air gap magnetic field are eliminated and motor drive 84 applies a correction to the fundamental component to generate an ideal fundamental component. An instantaneous current needed to generate the ideal fundamental component in electrical generator 90 and an exact instantaneous low voltage current waveform that when applied to the converter 112 will produce the needed instantaneous current, are determined by drive 84. Based on the desired current waveform, drive 84 generates an instantaneous non-sinusoidal DC field current demand that will produce the desired current waveform when applied to the converter/inverter 112. Based on the instantaneous non-sinusoidal DC field current demand from drive 84, converter/inverter 112 therefore generates and transmits a modified or second input 114 to electrical machine 90 having a desired non-sinusoidal current waveform.

While drive 84 and an accompanying electrical machine 90 are described in FIG. 5 as being incorporated into a HEV system 86 that produces tractive effort and electrical power via regenerative braking, it is recognized that a drive configured to implement a technique for exciting an electrical generator with instantaneous non-sinusoidal current waveforms is also applicable to other varied types of electrical machines.

Thus, embodiments of the invention directed to drives and drive controllers are applicable to electrical machines in numerous industrial, commercial, and transportation industries.

A technical contribution for the disclosed method and apparatus is that it provides for a controller implemented technique for exciting an electrical generator having concentrated stator windings by way of instantaneous non-sinusoidal current waveforms sent to rotor field windings. A control scheme is implemented that processes an initial DC field current demand applied to the inverter in order to generate instantaneous non-sinusoidal DC field current demands that will produce rotating air gap fields with only fundamental components and eliminate all field harmonics, thus resulting in the best energy conversion from the rotor to the stator, i.e. high power output at high efficiency.

Therefore, according to one embodiment of the invention, an electrical generator includes a stator having a plurality of fractional-slot concentrated windings, a rotor positioned within the stator to rotate relative thereto and having field windings electrically coupled thereto configured to generate a rotating magnetic field in an air gap between the stator and the rotor responsive to a current applied thereto, and a drive having an input connectable to a power source and an output connectable to the field windings. The drive further includes a circuit configured to control current flow to the field windings and a controller connected to the circuit and programmed to input an initial DC field current demand to the circuit to cause the circuit to output an initial DC field current, with the initial DC field current demand being representative of a DC field current demand that would cause an electrical generator having sinusoidal stator windings to output a desired AC power. The controller is further programmed to receive feedback on the rotating magnetic field generated by the initial DC field current, determine and isolate an ideal fundamental component of the rotating magnetic field based on the feedback, generate a modified DC field current demand based on the ideal fundamental component, and input the modified DC field current demand to the circuit, thereby causing the circuit to output an instantaneous non-sinusoidal current to the field windings to generate a sinusoidal rotating air gap magnetic field.

According to another embodiment of the invention, a method for generating AC power in an electrical generator having a stator having a plurality of fractional-slot concentrated windings and a rotor having a plurality of field windings is provided, that includes inputting a test DC field current demand to an inverter that is representative of a DC field current demand that would cause an electrical generator having sinusoidal stator windings to output a desired AC power and generating an initial DC field current in the inverter in response to the test DC field current demand, with the initial DC field current being output to the plurality of field windings on the rotor to generate a test rotating magnetic field between the rotor and the stator. The method also includes determining a fundamental component and harmonic components of the rotating magnetic field, determining an ideal fundamental component for the rotating magnetic field from the test DC field current demand and the fundamental component, and determining a desired current waveform based on the ideal fundamental component. The method further includes generating a modified DC field current demand based on the desired current waveform and inputting the modified DC field current demand to the inverter, thereby causing the inverter to output a non-sinusoidal AC current waveform to the plurality of field windings on the rotor to generate a sinusoidal rotating magnetic field, thereby generating AC power in the electrical generator.

According to yet another embodiment of the invention, an electrical generator includes a stator having a plurality of non-sinusoidal concentrated windings, a rotor positioned within the stator to rotate relative thereto and having field windings configured to generate a rotating magnetic field in an air gap between the stator and the rotor responsive to a current applied thereto, and a drive to control current flow from a power source to the field windings. The drive is configured to provide an initial input current to the rotor based on a first current demand that is representative of a DC field current demand that would cause an electrical generator having sinusoidal stator windings to output a desired AC power and receive feedback on the rotating magnetic field generated by the initial input current. The drive is further configured to generate a second current demand based on the feedback and provide an instantaneous modified input current to the field windings based on the second current demand so as to generate a sinusoidal rotating magnetic field in the air gap and generate AC power in the electrical generator, wherein the instantaneous modified input current comprises a non-sinusoidal current waveform.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for generating AC power in an electrical generator including a stator having a plurality of fractional-slot concentrated windings and a rotor having a plurality of field windings, the method comprising:

inputting a test DC field current demand to an inverter;

generating an initial DC field current in the inverter in response to the test DC field current demand, the initial DC field current being output to the plurality of field windings on the rotor to generate a test rotating magnetic field between the rotor and the stator;

detecting characteristics of the test rotating magnetic field generated by the initial DC field current;

determining a desired current waveform based on the detected characteristics of the test rotating magnetic field;

generating a modified DC field current demand, based on the desired current waveform, to produce the desired current waveform; and inputting the desired current waveform to the inverter, thereby causing the inverter to output a non-sinusoidal AC current waveform to the plurality of field windings on the rotor to generate a sinusoidal rotating magnetic field, thereby generating AC power in the plurality of fractional-slot concentrated windings.

2. The method of claim 1 further comprising:

determining a fundamental component and harmonic components of the test rotating magnetic field;

determining an ideal fundamental component for the test rotating magnetic field from the test DC field current demand and the fundamental component; and determining the desired current waveform based on the ideal fundamental component.

3. The method of claim 2 wherein determining the fundamental component and harmonic components comprises:
   detecting the test rotating magnetic field via one of a search coil and a plurality of Hall effect sensors; and
   applying a fast Fourier transform (FFT) to the detected test rotating magnetic field to identify the fundamental component and harmonic components.

4. The method of claim 2 wherein determining the ideal fundamental component of the test rotating magnetic field comprises accessing a lookup table having stored therein each of a plurality of DC field current demands and ideal fundamental components of a rotating magnetic field generated from each of the plurality of DC field current demands, each of the ideal fundamental components representing a highest fundamental component resulting from input of a DC field current demand to an electrical generator having sinusoidal stator windings.

5. The method of claim 2 further comprising performing a Laplace transfer function of the test rotating magnetic field, the Laplace transfer function of the test rotating magnetic field derived from the initial DC field current and the ideal fundamental component of the test rotating magnetic field.

6. The method of claim 2 wherein the modified DC field current demand adjusts a timing of an input current from a power source to produce the desired current waveform, thereby causing the inverter to output a non-sinusoidal AC current waveform to the plurality of field windings so as to generate a sinusoidal rotating magnetic field having the ideal fundamental component.

7. The method of claim 1 wherein the test DC field current demand is representative of a DC field current demand that would cause an electrical generator having sinusoidal stator windings to output a desired AC power.

8. A drive for controlling operation of an electrical generator having a stator with a plurality of fractional-slot concentrated windings and a rotor positioned within the stator and configured to rotate relative thereto, the rotor having a plurality of field windings electrically coupled thereto configured to generate a rotating magnetic field in an air gap between the stator and the rotor responsive to a current applied to the plurality of field windings, the drive comprising:
   an inverter configured to control current flow to the field windings; and
   a controller connected to the inverter and programmed to:
      input a test DC field current demand to an inverter;
      generate an initial DC field current in the inverter in response to the test DC field current demand, the initial DC field current being output to the plurality of field windings on the rotor to generate a test rotating magnetic field between the rotor and the stator;
      detect characteristics of the test rotating magnetic field generated by the initial DC field current;
      determine a desired current waveform based on the detected characteristics of the test rotating magnetic field;
      generate a modified DC field current demand, based on the desired current waveform, to produce the desired current waveform; and
      input the desired current waveform to the inverter, thereby causing the inverter to output a non-sinusoidal AC current waveform to the plurality of field windings on the rotor to generate a sinusoidal rotating magnetic field, thereby generating AC power in the plurality of fractional-slot concentrated windings.

9. The drive of claim 8 wherein the controller is further programmed to:
   determine a fundamental component and harmonic components of the rotating magnetic field;
   determine an ideal fundamental component for the rotating magnetic field from the test DC field current demand and the fundamental component; and
   determine the desired current waveform based on the ideal fundamental component.

10. The drive of claim 9 wherein, in determining the fundamental component and harmonic components, the controller is further programmed to:
    detect the test rotating magnetic field via one of a search coil and a plurality of Hall effect sensors; and
    apply a fast Fourier transform (FFT) to the detected test rotating magnetic field to identify the fundamental component and harmonic components.

11. The drive of claim 9 wherein, in determining the fundamental component and harmonic components, the controller is further programmed to access a lookup table having stored therein each of a plurality of DC field current demands and ideal fundamental components of a rotating magnetic field generated from each of the plurality of DC field current demands, each of the ideal fundamental components representing a highest fundamental component resulting from input of a DC field current demand to an electrical generator having sinusoidal stator windings.

12. The drive of claim 9 wherein the modified DC field current demand adjusts a timing of an input current from a power source to produce the desired current waveform, thereby causing the inverter to output a non-sinusoidal AC current waveform to the plurality of field windings so as to generate a sinusoidal rotating magnetic field having the ideal fundamental component.

13. The drive of claim 8 wherein the test DC field current demand is representative of a DC field current demand that would cause an electrical generator having sinusoidal stator windings to output a desired AC power.

14. The drive of claim 9 wherein the controller is further programmed to perform a Laplace transfer function of the test rotating magnetic field, the Laplace transfer function of the test rotating magnetic field derived from the initial DC field current and the ideal fundamental component of the rotating magnetic field.

15. A method for generating AC power in an electrical generator including a stator having a plurality of fractional-slot concentrated windings and a rotor having a plurality of field windings, the method comprising:
    inputting a test DC field current demand to an inverter, the test DC field current demand being representative of a DC field current demand that would cause an electrical generator having sinusoidal stator windings to output a desired AC power;
    generating an initial DC field current in the inverter in response to the test DC field current demand, the initial DC field current being output to the plurality of field windings on the rotor to generate a test rotating magnetic field between the rotor and the stator;
    determining a fundamental component and harmonic components of the test rotating magnetic field;
    determining an ideal fundamental component for the test rotating magnetic field from the test DC field current demand and the fundamental component;
    determining a desired current waveform based on the ideal fundamental component;
    generating a modified DC field current demand based on the desired current waveform; and inputting the modified DC field current demand to the inverter, thereby causing the inverter to output a non-sinusoidal AC current waveform to the plurality of field windings on the rotor to generate a sinusoidal rotating magnetic field, thereby generating AC power in the plurality of fractional-slot concentrated windings.

16. The method of claim 15 further comprising modifying an amplitude of the initial DC field current to generate the test rotating magnetic field in the electrical generator.

* * * * *